US010248452B2

(12) United States Patent
Portnoy et al.

(10) Patent No.: US 10,248,452 B2
(45) Date of Patent: Apr. 2, 2019

(54) INTERACTION FRAMEWORK FOR EXECUTING USER INSTRUCTIONS WITH ONLINE SERVICES

(71) Applicant: Microsoft Technology Licensing, LLC, Redmond, WA (US)

(72) Inventors: William Lawrence Portnoy, Woodinville, WA (US); Andres Monroy-Hernandez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 15/160,399

(22) Filed: May 20, 2016

(65) Prior Publication Data

US 2017/0337079 A1 Nov. 23, 2017

(51) Int. Cl.
G06F 9/46 (2006.01)
G06F 9/48 (2006.01)
G06F 9/54 (2006.01)
G06F 9/50 (2006.01)

(52) U.S. Cl.
CPC .......... *G06F 9/48* (2013.01); *G06F 9/50* (2013.01); *G06F 9/54* (2013.01)

(58) Field of Classification Search
None
See application file for complete search history.

(56) References Cited

U.S. PATENT DOCUMENTS

| 7,216,080 B2 | 5/2007 | Tsiao et al. |
| 7,752,152 B2 | 7/2010 | Paek et al. |
| 7,920,678 B2 | 4/2011 | Cooper et al. |

(Continued)

FOREIGN PATENT DOCUMENTS

| WO | 03107646 A1 | 12/2003 |
| WO | 2013095485 A1 | 6/2013 |

OTHER PUBLICATIONS

Botla, Purushotham, "Designing Personal Assistant Software for Task Management using Semantic Web Technologies and Knowledge Databases", In Theses of Massachusetts Institute of Technology, Jun. 2013, 112 pages.

(Continued)

*Primary Examiner* — Kenneth Tang
(74) *Attorney, Agent, or Firm* — International IP Law Group, PLLC (57) ABSTRACT

In order to complete user instructions beyond the scope of services that are provided on the user's own computing device, a framework an interaction framework for executing user instructions with online services is provided. The framework includes an instruction processing agent that interacts with a user agent on a computer user's computing device to execute instructions provided to the user agent. The instruction processing agent maintains a list of domain agents, each domain agent corresponding to a domain. Upon receiving a user instruction (from a user agent), the instruction processing agent identifies a suitable domain and corresponding domain agent for completing the user instruction and provides the instruction to the domain agent. The domain agent identifies an online service suitable for completing the user instruction and interfaces with the online service via a proxy for the online service to carry out the user instruction.

20 Claims, 8 Drawing Sheets

(56) References Cited

U.S. PATENT DOCUMENTS

| | | | |
|---|---|---|---|
| 8,677,377 B2 | 3/2014 | Cheyer et al. | |
| 9,015,730 B1 | 4/2015 | Allen et al. | |
| 9,721,566 B2* | 8/2017 | Newendorp | G10L 15/32 |
| 2004/0006653 A1* | 1/2004 | Kamen | G06F 9/541 |
| | | | 719/330 |
| 2004/0098727 A1 | 5/2004 | Bjare et al. | |
| 2005/0065994 A1 | 3/2005 | Creamer et al. | |
| 2009/0150156 A1* | 6/2009 | Kennewick | G06Q 30/0261 |
| | | | 704/257 |
| 2009/0187410 A1 | 7/2009 | Wilpon et al. | |
| 2010/0070360 A1 | 3/2010 | Gilbert et al. | |
| 2010/0161724 A1 | 6/2010 | Sathyan et al. | |
| 2012/0271676 A1 | 10/2012 | Aravamudan et al. | |
| 2013/0117022 A1 | 5/2013 | Chen et al. | |
| 2013/0166565 A1 | 6/2013 | Lepsoe | |
| 2013/0185081 A1 | 7/2013 | Cheyer et al. | |
| 2014/0272821 A1 | 9/2014 | Pitschel et al. | |
| 2015/0012271 A1* | 1/2015 | Peng | G10L 15/08 |
| | | | 704/235 |
| 2015/0350362 A1* | 12/2015 | Pollack | H04L 67/2861 |
| | | | 709/217 |
| 2016/0260433 A1* | 9/2016 | Sumner | G06F 17/30976 |

OTHER PUBLICATIONS

Miller, Dan, "Opusresearch: Unleash the Hound! SoundHound to Houndify Intelligent Assistance", Published on: Jun. 18, 2015, pp. 4. Available at: http://opusresearch.net/wordpress/2015/06/18/unleash-the-hound-soundhound-to-houndify-intelligent-assistance/.

"International Search Report and Written Opinion Issued in PCT Application No. PCT/US2017/032577", dated Aug. 2, 2017, 12 Pages.

* cited by examiner

INTERACTION FRAMEWORK FOR EXECUTING USER INSTRUCTIONS WITH ONLINE SERVICES

BACKGROUND

More and more people are using their mobile devices to carry out tasks. Many times though not exclusively, the instructions from the device user to a digital assistant operating on the device are delivered via voice/audio instructions. For example, a person my request (via voice) that the digital assistant operating on the mobile device set an alarm for the following morning, or to place a phone call to a particular person. Unfortunately, the scope of actions that the digital assistant can take on behalf of the device user is limited by the functionality available to the digital assistant on the mobile device. In the example of setting an alarm, typically the digital assistant has access to an alarm functionality on the mobile device and can communicate with that functionality to set the alarm. Similarly, in the example of making a call, the digital assistant is aware of and has access to the calling functionality (and maybe even the address book functionality) on the mobile device and can place the requested call on the person's behalf.

In those circumstances where the person instructs the digital assistant to order a pizza and have it delivered, unless there is some functionality available on the computing device for ordering pizzas and this functionality is known to the digital assistant, a pizza is not ordered. In those situations where the functionality does not reside on the mobile device the request, a typical compromise may be to identify an online location in which the person (i.e., the device user) can place an order for pizza and provide a reference (e.g. a hyperlink) to that location. Some digital assistants may even navigate a browser to the location such that the device user can place an order, but it is left to the device user to perform the tasks/actions necessary to get the pizza ordered and delivered.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In order to complete user instructions beyond the scope of services that are provided on the user's own computing device, a framework an interaction framework for executing user instructions with online services is provided. The framework includes an instruction processing agent that interacts with a user agent on a computer user's computing device to execute instructions provided to the user agent. The instruction processing agent maintains a list of domain agents, each domain agent corresponding to a domain. Upon receiving a user instruction (from a user agent), the instruction processing agent identifies a suitable domain and corresponding domain agent for completing the user instruction and provides the instruction to the domain agent. The domain agent identifies an online service suitable for completing the user instruction and interfaces with the online service via a proxy for the online service to carry out the user instruction.

According to aspects of the disclosed subject matter, a computer-implemented framework for processing one or more user instructions on behalf of a computer user is presented. The computer-implemented comprises first computing device hosting an instruction processing agent and one or more domain agent computing devices. The first computing device hosts an instruction processing agent, where the instruction processing agent is configured to receive a user instruction from a user agent executing on a user computing device, and carry out the instruction on behalf of the computer user. The one or more domain agent computing devices host a plurality of domain agents. Each domain agent, in execution on a domain agent computing device corresponds to a domain and is configured to receive a user instruction from the instruction processing agent that can be carried out within the domain, and carry out the instruction on behalf of the computer user with an online service.

According to additional aspects of the disclosed subject matter, a computer system providing an instruction processing agent service for processing user instructions on behalf of a computer user is presented. The computing system comprising a processor and a memory, wherein the processor executes computer-executable instructions obtained from memory to provide the instruction processing agent service. In addition to the processor and memory, the computer system further comprises an executable instruction processing agent. In execution the instruction processing agent is configured to receive a user instruction from a user agent on behalf of a computer user and identify a domain suitable for carrying out the user instruction. Additionally, the instruction processing agent selects a domain agent of a plurality of domain agents according to a domain selector, the selected domain agent corresponding the identified domain, and submits the user instruction to the selected domain agent for execution on behalf of the computer user.

According to further aspects of the disclosed subject matter, a computer system for providing a domain agent service for processing user instructions on behalf of a computer user is presented. The computer system comprises at least a processor and a memory, wherein the processor executes computer-executable instructions obtained from memory to provide the domain agent service. The computer system further comprises a plurality of online service proxies, where each online service proxy is configured to interface the domain agent with a corresponding online service for executing user instructions with the online service on behalf of the domain agent. In execution, the domain agent receives a user instruction from the instruction processing agent for execution. In response the domain agent identifies an online service from a plurality of online services for completing the user instruction and executes the user instruction with the identified online service via a corresponding online service proxy of the plurality of online service proxies. The domain agent then returns result information regarding execution of the user instruction to the instruction processing agent.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity and definition, the term "exemplary," as used in this document, should be interpreted as serving as an illustration or example of something and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there are multiple instances of the term/item. For example, the term "user(s)" should be interpreted as one or more users.

In contrast to a digital assistant being constrained to the functionality disposed/available on the computing device, and according to aspects of the disclosed subject matter, a user agent is provided with a set of domain agents. Each domain agent is implemented as an online service that can receive user instructions pertaining to a particular domain to which the domain agent is associated. According to aspects of the disclosed subject matter, the user instructions are provided from the user agent to the domain agent according to a domain ontology corresponding to the domain associated with the domain agent.

According to various embodiments of the disclosed subject matter, the ontologies by which the user agent communicates with a domain agent include a set of nouns and verbs for describing the instructions/actions that the domain agent is to carry out on behalf of the device user, where nouns correspond to items/topics and verbs correspond to actions to be taken.

According to additional aspects of the disclosed subject matter, a domain agent maintains and interacts with a set of online services for carrying out a device user's instructions/requests within the domain of the domain agent. As each online service interacts with external parties (such as a domain agent) via a particular set of APIs (application programming interfaces), a domain agent will maintain a proxy interface corresponding to each online service, where the proxy interface maps a received instruction from a user agent into one or more specific online service calls and parameters, per the corresponding online service's APIs, as well as returning data from the various API calls.

Figure 1:
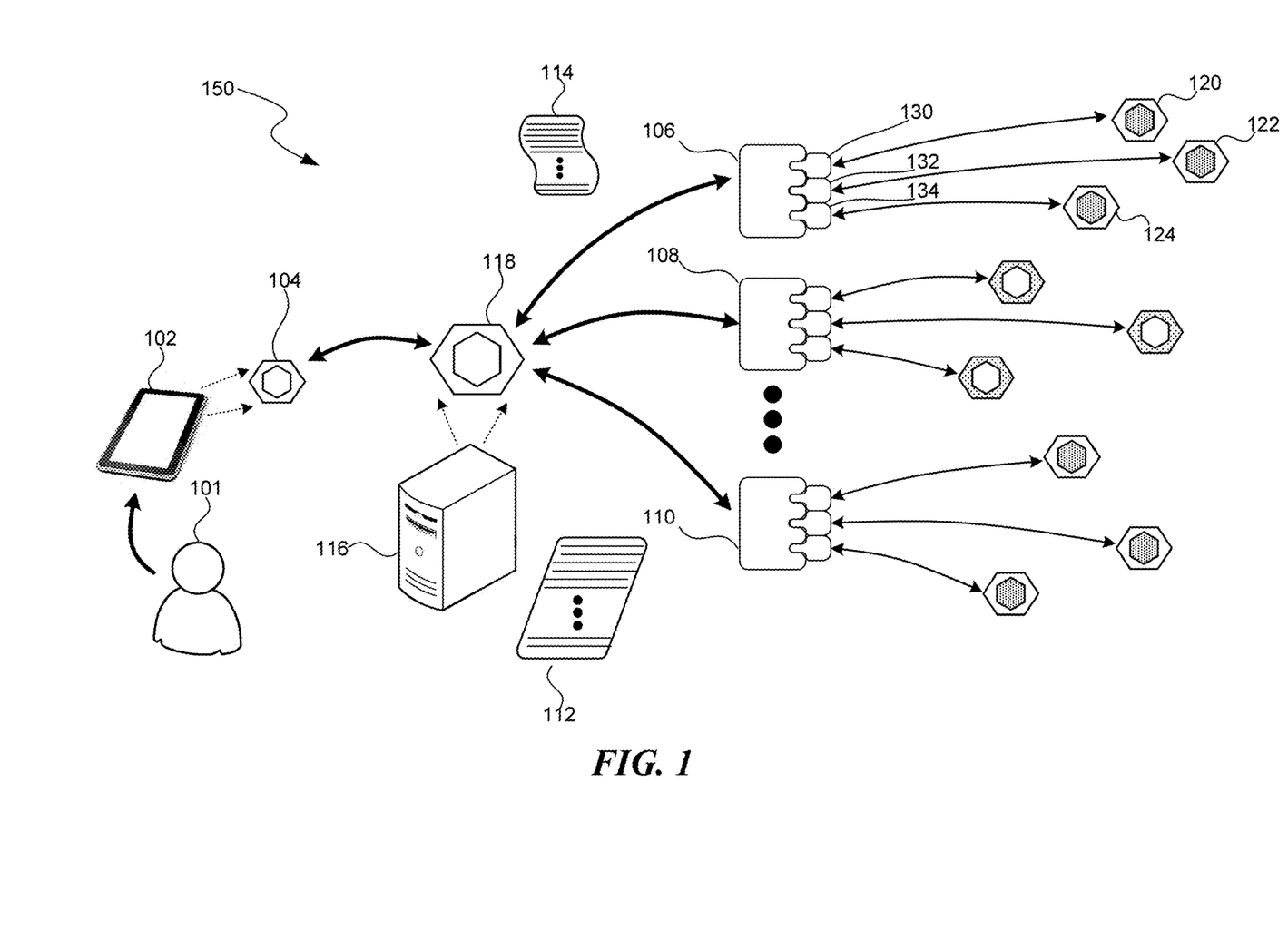
FIG. 1 is a block diagram illustrating an exemplary arrangement of framework elements suitable for implementing aspects of the disclosed subject matter.

Turning now to the figures, FIG. 1 is a block diagram illustrating an exemplary arrangement 100 of framework elements suitable for implementing aspects of the disclosed subject matter. The exemplary components include a user computing device, such as computing device 102. According to a first embodiment of the disclosed subject matter, operating as an executable process on the computing device 102 is a user agent 104. As discussed above, a device user, such as user 101, issues commands that implicate services that are not installed on the computing device to the user agent 104. By way of example and illustration, an instruction may be issued such as, "Order a cheese pizza and have it delivered," or "Call a taxi."

In response to the instruction (or instructions) and according to a first illustrative embodiment, the user agent 104 may translate or cause the translation of the received instruction to a common format, e.g., transcribing an audio file of the instruction(s) to a textual representation. In an alternative embodiment, the user agent 104 does not translate the received instruction but simply passes the instruction on to an instruction processing agent 118 executing as an online service on a remote computing device 116 (or remote computing devices or cloud service). In the latter embodiment, upon receipt, the instruction processing agent 118 either translates or causes the translation of the received instruction to the common format.

At the instruction processing agent 118, once the instruction is in the common format, an analysis of the instruction (or instructions if there are plural) is made to identify the intent of the user. Based on the intent of the instruction, a domain of the instruction is identified/selected. Selection/identification of a domain is typically, though not exclusively, made according to a catalogue 112 of domains. For example, if the received user instruction were, "Order a cheese pizza and have it delivered," the analysis may determine that the domain is in regard to the domain "Food Services." Alternatively, the analysis may determine that the domain corresponds to a more specific domain (assuming there is a more specific domain in the catalogue 112 of domains, such as "Food Services/Pizza" or, more simply, "Pizza." Irrespective of whether the domains are identified broadly or narrowly and according to various aspects of the disclosed subject matter, the intent of the received user instruction is used to identify a domain according to the catalogue 112 of domains based on a general ontology that is descriptive of a plurality of domains.

At the instruction processing agent 118 and with the domain identified, the received user instructions are transcribed or mapped into one or more domain instructions based on a domain ontology 114 of nouns and verbs corresponding to the identified domain. According to aspects of the disclosed subject matter, there is a domain ontology, such as domain ontology 114, for each domain that is available for selection by the instruction processing agent 118.

In addition to transcribing the received instructions (from the common format) to domain instructions according to the domain ontology of the selected domain, a domain agent, such as domain agent 106, is identified and the domain instruction(s) are transmitted by the instruction processing agent 118 to the selected domain agent (or domain agents, as there may be multiple domain agents associated with a given domain and the received user instruction may implicate or suggest that multiple domain agents may or should process the instructions) for execution.

As indicated above, a set of domain agents, e.g., domain agents 106-110, each corresponding to one or more domains, is provided and available to the instruction processing agent 118. As will be appreciated, each domain agent is configured to process the received instruction(s) on behalf of the device user within its corresponding domain.

According to additional aspects of the disclosed subject matter, each domain agent, such as domain agents 106-110, is configured to execute domain specific instructions (according to the corresponding domain ontology 114) on behalf of the device user. In order to carry out the various instructions, each domain agent maintains and interacts with a set of external online services, such as online services 120-124, for carrying out a device user's instructions within the domain of the corresponding domain agent. It should be appreciated, of course, that each online service, such as online services 120-124, interacts with external parties (such as a domain agent 106) via its own set of APIs. Accordingly, in order to interact with online services that each maintain its own set of APIs, each domain agent 106-110 will maintain a set of proxy interfaces 130-134, each proxy interface corresponding to a specific online service, where the proxy interface maps a domain instruction into one or more specific online service calls and parameters, according to the corresponding online service's APIs, as well as returning data from the various API calls. For example, domain agent 106 includes proxies 130-134 that interface the domain agent with corresponding online services 120-124.

Through this framework of user agent 104, instruction processing agent 118, domain agents 106-110, and proxy interfaces 130-134, a device user 101 is able to issue a command/instruction for a service that is not disposed or available on the user's computing device 102, and have that command carried out, rather than leaving it to the user to manually carry out the instructions with the specific online services.

Regarding the arrangement of the various components of FIG. 1, while the user agent 104 and the instruction processing agent 118 are illustrated as being implemented on separate computing devices, it should be appreciated that this is an illustrative representation and should not be viewed as limiting upon the disclosed subject matter. Indeed, in various embodiments the elements of the instruction processing agent 118 may be completed and/or partially implemented on the user agent. Similarly, much, if not all of the user agent 104 may be implemented on a remote computing device hosting to the user's computing device 102.

Figure 2:
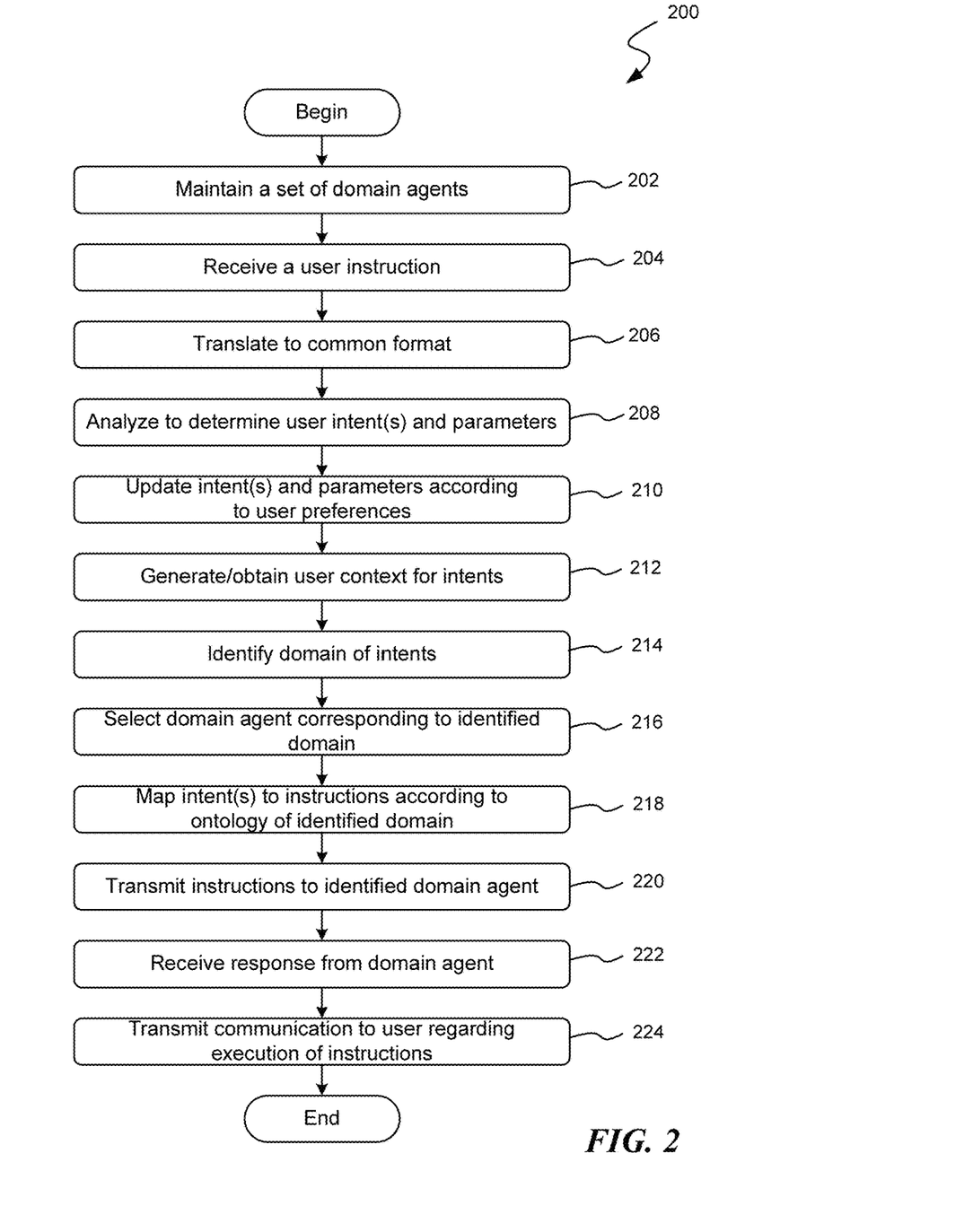
FIG. 2 is a flow diagram illustrating an exemplary routine, implemented by an instruction processing agent, for processing user instructions by a according to aspects of the disclosed subject matter.

Turning now to FIG. 2, FIG. 2 is a block diagram illustrating an exemplary routine, implemented by an instruction processing agent such as instruction processing agent 118, for processing user instructions according to aspects of the disclosed subject matter. As part of the routine 200, at block 202 a set of domain agents is maintained by (or for) the instruction processing agent. As indicated above, each domain agent, such as domain agent 106, is associated with one or more domains and configured to process user instructions drafted according to a domain ontology for the domain in which the domain agent operates. While domain agents may be offered by the same service provider of the instruction processing agent, they may alternatively be provided by external parties to, and registered with, the instruction processing agent. As indicated above, the catalogue 112 of domains lists the domains and, further, includes a list of domain agents, such as domain agents 106-110, associated with a domain. According to one embodiment of the disclosed subject matter, the set of domain agents is maintained in such as manner, such as a look-up table, that for a given identified domain, one or more domain agents are identified.

At block 204, a user instruction is received from the user agent 104 operating on the user's computing device 102. As indicated above, while the user instruction may be supplied in a common format, i.e., having been transcribed by the user agent 104 on the user device 102, the user instruction may alternatively be received in an "as received" form, such as an audio file representing a spoken command or a textual command. Accordingly, at block 206, if the user instruction is not received in a common format from the user agent 104, the user instruction is optionally transcribed to a common format.

At block 208, the received user instruction (in the common format for processing) is analyzed to identify/determine the user's intent with regard to the instruction (or instructions) and to also identify any parameters or qualifiers that the user may have supplied. While the instruction processing agent 118 may include one or more executable components for analyzing and identifying a user's intent with regard to a received instruction, according to aspects of the disclosed subject matter, identifying and/or determining the intent of the user's instruction(s) may be completed through the use of an external service, such as Microsoft's Language Understanding Intelligence Service (LUIS). In these requests, the external service (such as LUIS) identifies the intent of a user's instructions according to models that recognize entities from the basis (i.e., the user instruction), including places, times, numbers, temperatures, as well as recognizing user requests and/or instructions. Moreover, based on the analysis of the subject matter submitted, the external service responds with the identified intent in a readily computer-usable form, such as JSON (JavaScript Object Notation) data. Of course, while one or more embodiments of the disclosed subject matter may make use of external services and technologies such as LUIS and JSON in identifying the intent of a user's instruction(s) and converting those to a readily consumable format, including LUIS and JSON, should be viewed as illustrative services and/or technologies and should not be construed as limiting upon the disclosed subject matter.

Referring to the earlier example, "Order a cheese pizza and have it delivered," at block 208, whether by an element of the instruction processing agent 118 or by an external service as discussed above, an analysis identifies the user's intent/instruction as a directive to (1) order a pizza, (2) that it should be a cheese pizza, and (3) that the pizza should be delivered to the user.

At block 210, the instructions and corresponding parameters are optionally updated according to user preferences. Updating the instructions and parameters according to user preferences may involve obtaining user preferences from the user, if the preferences are not maintained by the instruction processing agent 118. In regard to updating the instruction and/or parameters according to user preferences and by way of illustration, a user may have established a preference for pizzas from a particular vendor, and updating the instruction/parameters ("Order a cheese pizza and have it delivered") reflected the particularly preferred vendor. In addition to a preferred source, information regarding purchase instruments (e.g., credit cards, online payment services, account information, etc.), sizes, shipping methods, and the like may be provided through user preferences and corresponding data.

In addition to user preferences, at block 212, user context may be generated or obtained if already existing, and used to update the intent and/or parameters of the instructions. As with obtaining user preferences, obtaining a user context may include communicating with the user agent 104 on the user's computing device 102 in order to obtain user context data. For example, in the instruction, "Order a cheese pizza and have it delivered," omits the location where the pizza is to be delivered. Accordingly and as a result of the analysis, a delivery location for the user must be determined. While this location may come from user preferences, it may alternatively come from user context. For example, if the user's current context suggests that the user is en-route to his/her residence, then the user agent 104 may determine that the delivery location should be the user's residence and provide that information to the instruction processing agent 118.

After updating the intent(s) and parameters of the user's instruction(s) according to both explicit and implicit user preferences and user context data, at block 214 the domain of the user intent is identified according to the catalogue 112 of domains. Identifying the domain may involve a matching process between the identified user intent (as determined in block 208) to one or more intents from the catalogue 112 of domains. Indeed, the catalogue 112 of domains may include information that associates a domain to various intents that can be satisfied within the domain. Fuzzy matching may also be utilized to map/select a domain to a particular intent.

Once the domain is identified, at block 216 a domain agent (or domain agents) are identified. As indicated above, the catalogue 112 of domains may include information regarding domain agents for a corresponding domain. Alternatively, such information may be kept in a separate list/catalogue.

At block 218, the user's intent and parameters, as well as data from user preferences and/or user context, are mapped as instructions for a domain agent according to the domain ontology 114 corresponding to the identified domain. Thereafter, at block 220 the mapped instruction(s) and parameters (if any) are transmitted to the identified domain agent. According to various embodiments of the disclosed subject matter, the user's intent and parameters are mapped as instruction to the domain ontology 114 as REST-styled (Representational State Transfer) objects and/or communications formed or organized according to a particular domain ontology.

As will be discussed below, when a domain agent, such as domain agent 106, receives instructions and parameters, the domain agent then selects from the online services that are available and interacts with that online service to carry out the instruction(s) from the device user.

At block 222, a response from the domain agent, typically in response to receiving its own response from the online service is received. Contextual data regarding the user's action may be updated according to any results or effects of executing the instructions. Thereafter, at block 224, the communication regarding execution of the instruction(s) by the online service is transmitted to the user 101 via the user agent 104. Thereafter, routine 200 terminates.

It should be appreciated that routine 200 is simplified in various respects. Most importantly, there are often occasions where an online service may request additional information that was not provided with the initial request. These requests may occasion communication (through the instruction processing agent 118 and user agent) with the device user to provide additional information. For example and continuing the illustrative instructions of ordering a pizza above, a request from an online service may wish to know the size of the cheese pizza to be delivered, or a time for delivery. While the user agent 104 may have such information accessible in the form of user preferences and/or user context, in some circumstances a communication channel between the online service and the device user may be necessary and would be facilitated by the framework including the user agent 104, the instruction processing agent 118, and domain agent 106.

As indicated above and according to aspects of the disclosed subject matter, more than one domain agent may be selected to carry out a particular instruction of the user. Further still, any given domain agent may select more than one online service to process a user request. One example of multiple selections of domain agents and/or online services may arise when a user instruction is in regard to determining information. For example, a user instruction may be "Who can deliver a cheese pizza in the next 30 minutes?" In this and other circumstances, it may be left to the instruction processing agent 118 to aggregate, present and even select from among the various responses to a user instruction.

It should be appreciated that as part of aggregating information, contextual information regarding one or more user instructions may be maintained by a domain agent and/or the instruction processing agent 118. For example, domain agents in the area of online shopping may maintain a context for the device user that represents a metaphorical "shopping cart," thereby providing the ability to add items to the online shopping cart, delete items, create sub-totals of items in the shopping, review/inventory items in the shopping cart, determine shipping charges and taxes for individual items and/or all items in the shopping cart, move items to user wish lists and/or wait lists, and the like. As can be seen, a current context or state is determined as a function of one or more activities of the domain agent. These states may be persisted on behalf of the user by the domain agent and/or by the instruction processing agent 118, including between sessions and between receipt of user instructions. For example, over the course of several instructions a user may submit (via the user agent 104) a series of commands to a shopping domain agent to add various items to the shopping cart, compare items, obtain purchase prices, and ultimately purchase some or all of the items. Moreover, the various items may be obtained by the domain agent from multiple online service provides such that the context/state maintained by the domain agent is very useful to completing the user's multiple instructions. Of course, each domain agent will maintain various context information for the user in regard to one or more user instructions, each dependent on the needs of the corresponding domain.

Figure 3:
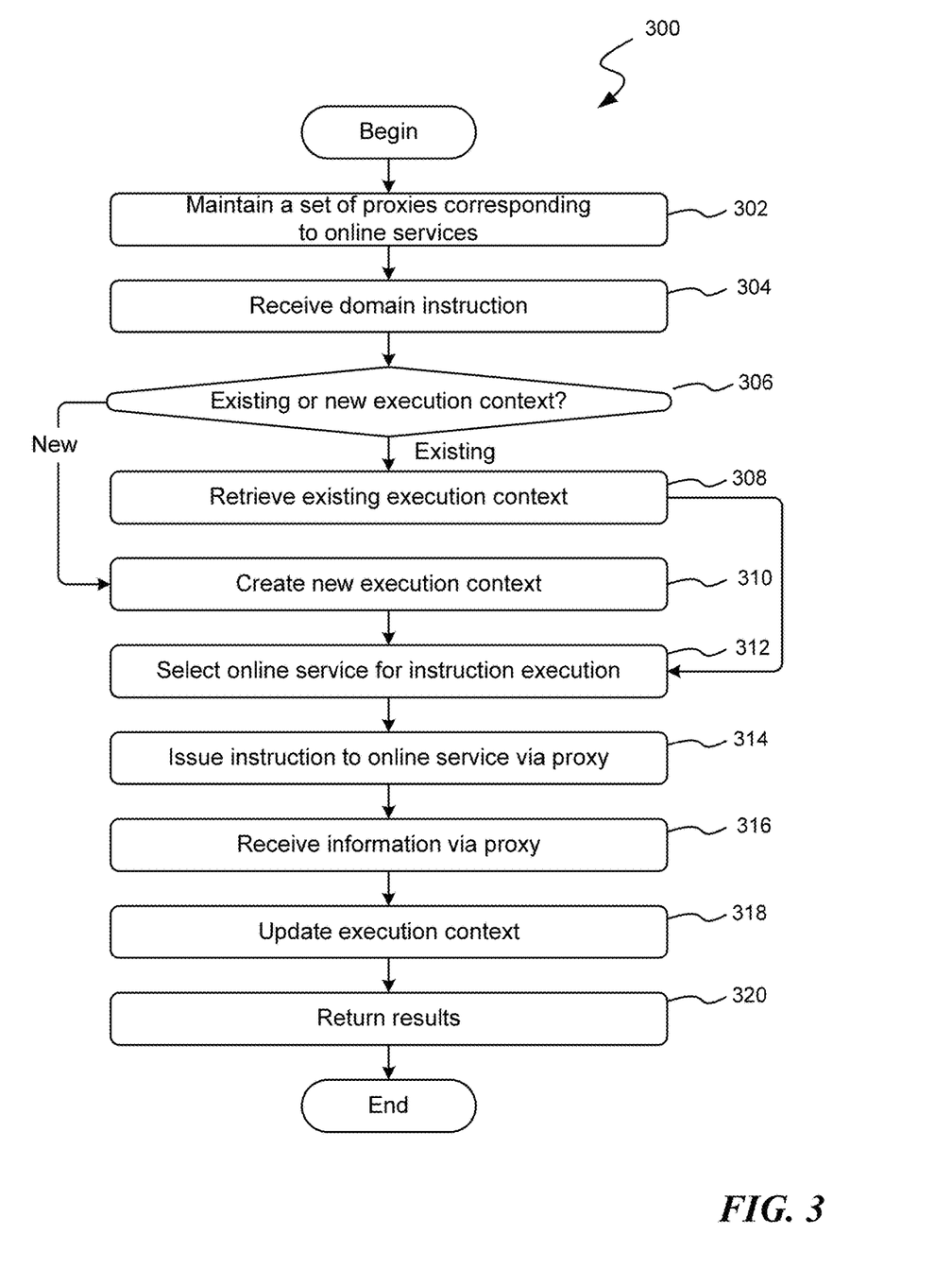
FIG. 3 is a flow diagram illustrating an exemplary routine, as implemented by a domain agent, for processing a user's instruction.

While FIG. 2 is described in regard to the instruction processing agent 118, FIG. 3 is a flow diagram illustrating an exemplary routine 300, as implemented by a domain agent, for processing a user's instruction. Beginning at block 302, a set of proxies for a corresponding set of online services is maintained. At block 304, a user instruction, in the form of a domain instruction as discussed above, is received.

Blocks 306-310 correspond to determining an execution context for execution of the user instruction. At decision block 306, a determination is made as to whether the received instruction corresponds to an existing execution context for the user, or whether the instruction is made in regard to a new execution context. If the determination is that the instruction corresponds to an existing execution context, the routine 300 proceeds to block 308 where the existing execution context is retrieved for usage. Alternatively, if the instruction corresponds to a new execution context, the routine 300 proceeds to block 310 where a new execution context for the user is created for use.

At block 312, based on the received instruction to execute, an online service is selected. According to various aspects of the disclosed subject matter, selection of the online service from the set of online services may be made according to the execution context, user preferences, user context, and parameters provided to the domain agent in regard to the received instruction.

At block 314, the instruction and parameters (if any) are issued to the online service via the corresponding proxy that is maintained for the selected online service. As discussed above, issuing the instruction may entail mapping the online instruction into one or more API service calls on the online service via the proxy for the online service.

At block 316, information regarding the execution of the received instruction is received, via the proxy for the online service. At block 318, updates to the execution context are made, if any are applicable. At block 320, the results of the execution are returned/communicated to the instruction processing agent 118. Thereafter, the routine 300 terminates.

Regarding routines 200 and 300 described above, as well as other processes describe herein, while these routines/processes are expressed in regard to discrete steps, these steps should be viewed as being logical in nature and may or may not correspond to any specific actual and/or discrete steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing devices described in regard FIGS. 4-6 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines/processes are typically embodied within executable code modules comprising routines, functions, looping structures, selectors and switches such as if-then and if-then-else statements, assignments, arithmetic computations, and the like. However, as suggested above, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure computer readable media expressly excludes carrier waves and/or propagated signals.

Figure 4:
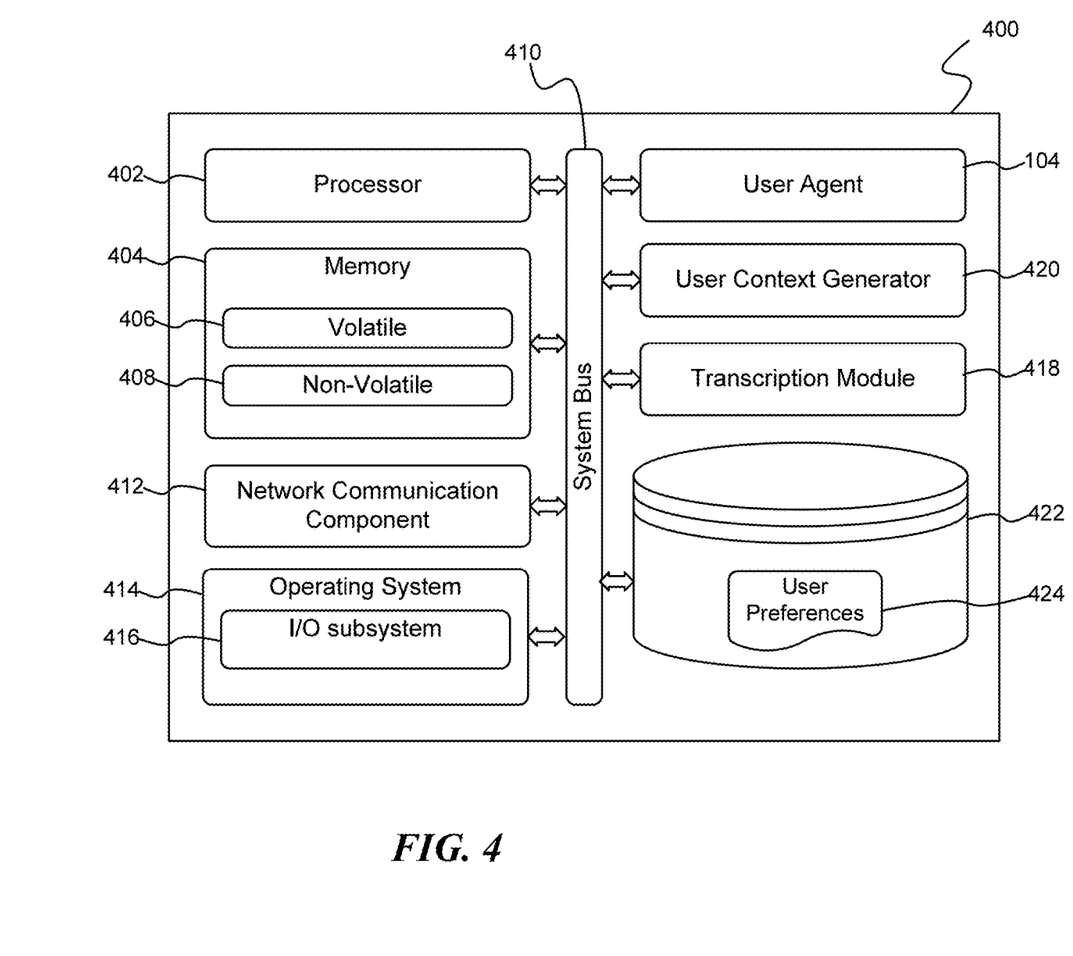
FIG. 4 is a block diagram illustrating elements of an exemplary user computing device suitable for implementing one or more aspects of the disclosed subject matter, particularly in regard to a user agent.

Turning now to the various elements of the overall framework for executing a user instruction, FIG. 4 is a block diagram illustrating elements of an exemplary user computing device 400 suitable for implementing one or more aspects of the disclosed subject matter. While the exemplary user computing device 400 is described with regard to various illustrative elements and/or components, the various user computing devices that may be used to implement these aspects include, by way of illustration and not limitation, mobile phones, tablet computing devices, the so-called "phablet" computing devices (hybrid phone/tablet devices), personal digital assistants, smart watches and other wearable computing devices, laptop computers, and the like.

The exemplary user computing device 400 includes one or more processors (or processing units), such as processor 402, and one or more memories, such as memory 404. The processor 402 and memory 404, as well as other components, are interconnected by way of a system bus 410. The memory 404 typically (but not always) comprises both volatile memory 406 and non-volatile memory 408. Volatile memory 406 retains or stores information so long as the memory is supplied with power. In contrast, non-volatile memory 408 is capable of storing (or persisting) information even when a power supply is not available. Generally speaking, RAM and CPU cache memory are examples of volatile memory 406 whereas ROM, solid-state memory devices, memory storage devices, and/or memory cards are examples of non-volatile memory 408.

Figure 7:
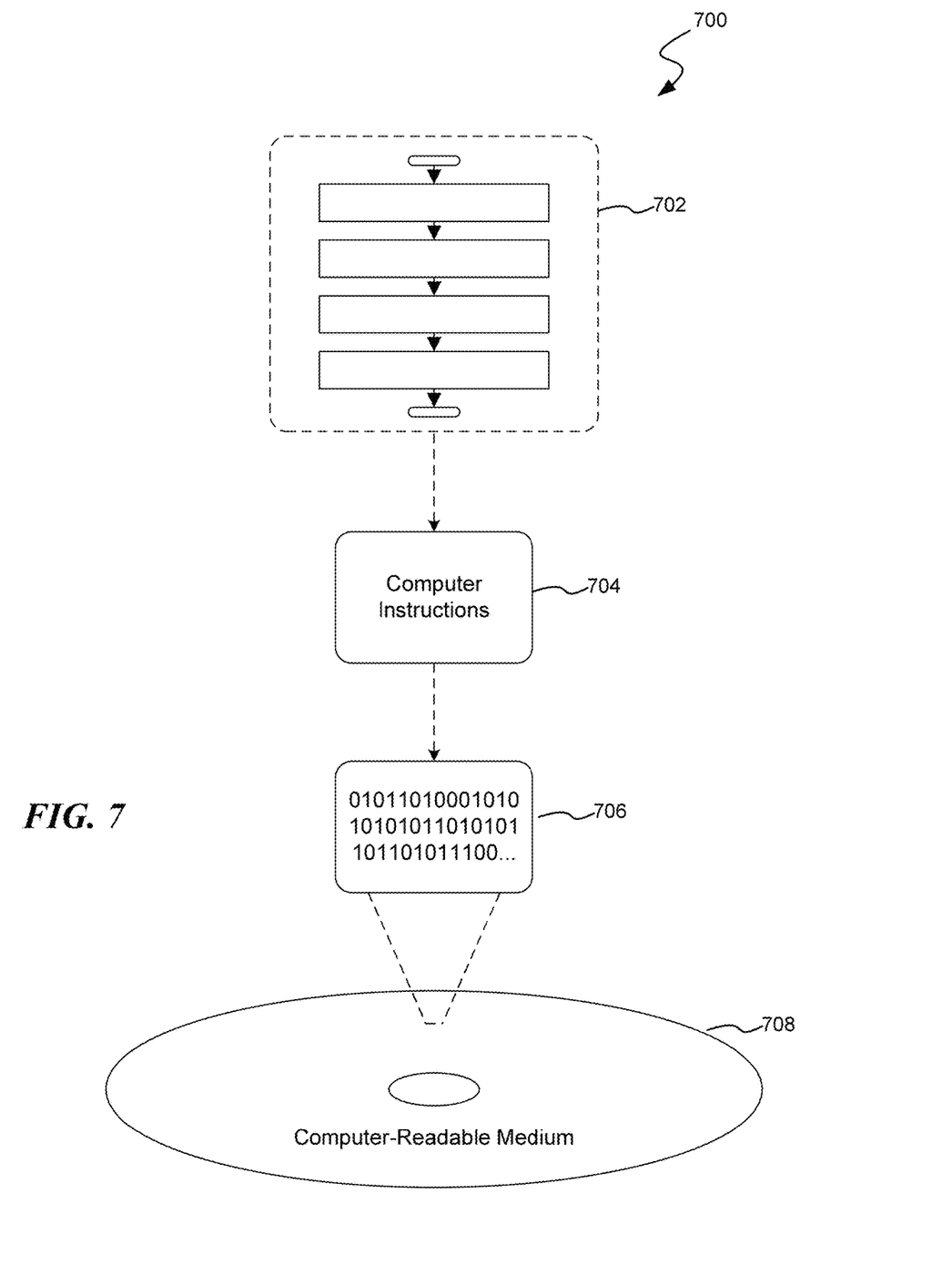
FIG. 7 is a block diagram illustrating an exemplary computer readable medium formed according to aspects of the disclosed subject matter.

As will be appreciated by those skilled in the art, the processor 402 executes instructions retrieved from the memory 404 (and/or from computer-readable media, such as computer-readable media 700 of FIG. 7) in carrying out various functions of an a user agent 104, as set forth above. The processor 402 may be comprised of any of a number of available processors such as single-processor, multi-processor, single-core units, and multi-core units.

Further still, the illustrated user computing device 400 includes a network communication component 412 for interconnecting this computing device with other devices and/or services over a computer network, including computing systems hosting an instruction processing agent 118, such as computing system 116. The network communication component 412, sometimes referred to as a network interface card or NIC, communicates over a network (such as network 808 of FIG. 8) using one or more communication protocols via a physical/tangible (e.g., wired, optical, etc.) connection, a wireless connection, or both. As will be readily appreciated by those skilled in the art, a network communication component, such as network communication component 412, is typically comprised of hardware and/or firmware components (and may also include or comprise executable software components) that transmit and receive digital and/or analog signals over a transmission medium (i.e., the network.)

The illustrated user computing device 400 also includes an operating system 414. As those skilled in the art will appreciate, an operating system is computing device software that manages the device's hardware and software resources, and that provides common services, sometimes called system services, for computer programs that execute on the computing device. An element of the operating system 414 is an I/O (input/output) subsystem 416. The I/O subsystem 416 provides the channels for communication between the computing device 400 and the "outside world," e.g., a human or another information computing device and/or system. For the I/O subsystem 416, inputs are the signals or data received by the computing device and outputs are the signals or data sent from it. The I/O subsystem 416 typically includes one or more user interfaces, such as output devices and input devices. Output devices may include, by way of illustration and not limitation, display screens, haptic output devices, audio devices, and the like. Input devices include, by way of illustration and not limitation, text input devices, touch devices, mouse and other pointing devices, NUI (natural user-interface) devices such as audio capture devices, video devices, and the like. By way of illustration and not limitation, a user, such as user 101, may issue a command to a user agent 104 via an audio capture device (e.g., a microphone).

Also included in the illustrated user computing device 400 is a device-executable user agent 104. In execution, the user agent 104, being part of the framework for carrying out various user instructions through services that are not available and/or disposed on the user computing device 400, receives user instructions and communicates with an instruction processing agent 118 in order to have the instruction executed. In conjunction with the user agent 104, or, alternatively, as part of the user agent, a device-executable user context generator 420 is included that provides contextual information regarding the user, as discussed above in regard to block 212 of FIG. 2. Still further, in conjunction with the user agent 104, or, alternatively, as part of the user agent, a device-executable transcription module 418 is optionally included to provide a transcription of an audio file to a common format. In various embodiments, the transcription module 418 communicates with an online service over a computer network to obtain a transcription of an audio file. Alternatively, the transcription module 418 (if included as an element of the user computing device 400) may be configured to carry out the transcription without external assistance.

Still further, the user computing device 400 includes a data store 422 in which user preferences 424 may be stored. As discussed above in regard to block 210, in some embodiments the instruction processing agent 118 may request the user preferences 424 of the user from the user agent 104 over a network. Of course, in an alternative embodiment, user preferences may be maintained by the instruction processing agent 118 or another third party service.

Figure 5:
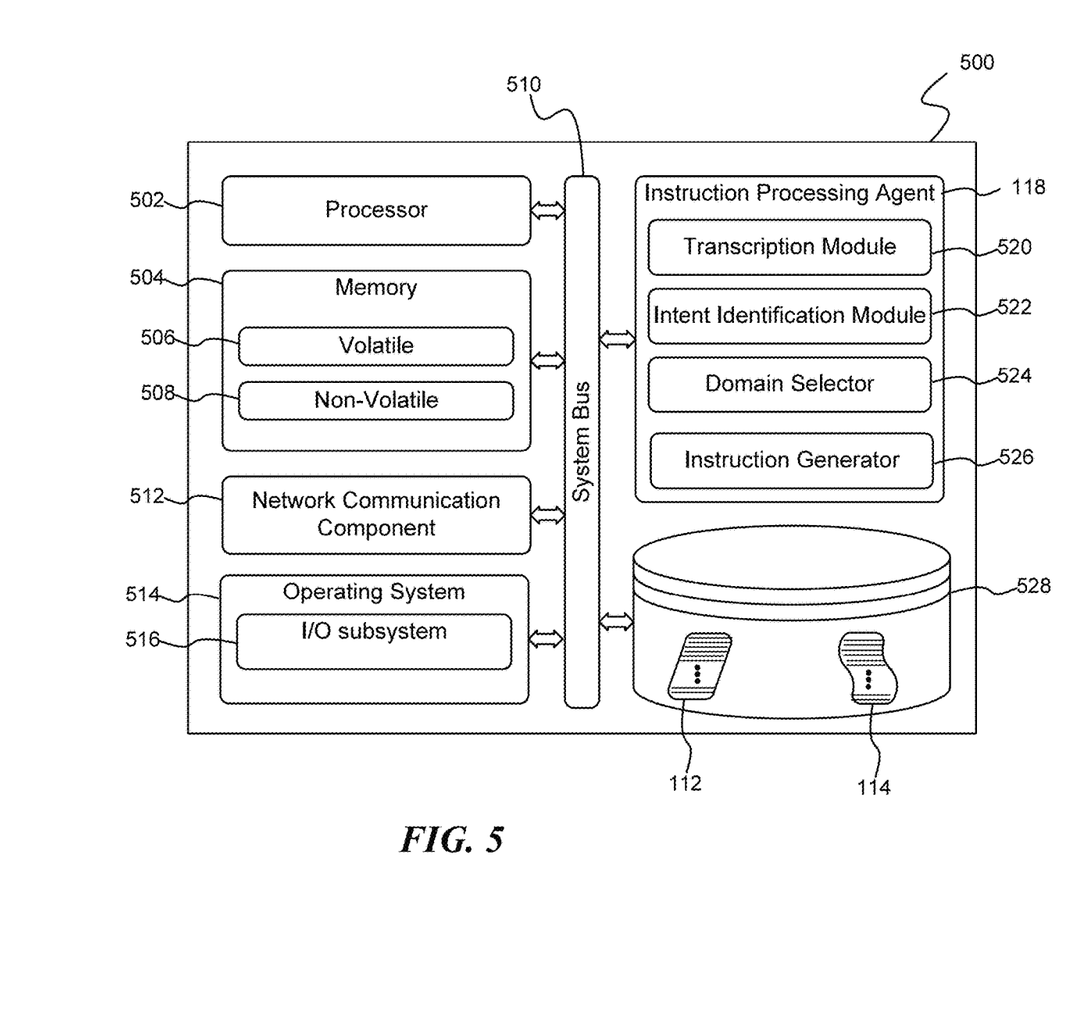
FIG. 5 is a block diagram illustrating an exemplary computing device suitable for implementing one or more aspects of the disclosed subject matter, particularly in regard to the instruction processing agent.

FIG. 5 is a block diagram illustrating an exemplary computing device 500 suitable for implementing one or more aspects of the disclosed subject matter, particularly in regard to the instruction processing agent 118 discussed above. As typical with computing devices generally, exemplary computing device 500 includes one or more processors (or processing units), such as processor 502, and one or more memories, such as memory 504. The processor 502 and memory 504, as well as other components, are interconnected by way of a system bus 510. The memory 504 typically (but not always) comprises both volatile memory 506 and non-volatile memory 508. The processor 502 executes instructions retrieved from the memory 504 (and/or from computer-readable media) in carrying out various functions of the instruction processing agent 118, as set forth above. The processor 502 may be comprised of any of a number of available processors such as single-processor, multi-processor, single-core units, and multi-core units.

The illustrated exemplary computing device 500 also includes a network communication component 512 for interconnecting this computing device with other devices and/or services over a computer network, including the exemplary user computing device 400 hosting the user agent 104, as well as other network computing devices and/or systems, including those that host domain agents. As discussed above, the network communication component 512, sometimes referred to as a network interface card or NIC, communicates over a network (such as network 808 of FIG. 8) using one or more communication protocols via a physical/tangible (e.g., wired, optical, etc.) connection, a wireless connection, or both. As will be readily appreciated by those skilled in the art, a network communication component, such as network communication component 512, is typically comprised of hardware and/or firmware components (and may also include or comprise executable software components) that transmit and receive digital and/or analog signals over a transmission medium (i.e., the network.)

The exemplary computing device 500 also includes an operating system 514 to manage the device's hardware and software resources, and that provide common services, sometimes called system services, for computer programs and other executable processes that execute on the computing device including the instruction processing agent 118. An element of the operating system 514 is an I/O (input/output) subsystem 516 by which various executable processes, including the instruction processing agent 118, communicate with other devices and services, both resident on the computing system as well as those external to the computing system.

As indicated, the exemplary computing device 500 includes a device-executable instruction processing agent 118. As discussed above and in execution, the instruction processing agent 118 receives one or more instructions from the user agent 104 on behalf of a device user and carries out the instruction(s) via domain agents, such as domain agents 106-110. Included in (or, alternatively, as a cooperative executable components to) the instruction processing agent 118 are various other device-executable components including a transcription module 520, an intent identification module 522, a domain selector 524, and an instruction generator 526.

Regarding the transcription module 520, in execution, provides a transcription of an audio file to a common format. Typically, though not exclusively, the instruction processing agent 118 conducts the transcription of data from a natural user interface (NUI), such as audio commands/instructions captured by an audio recording device on the user's computing device. According to various embodiments, the transcription module 520 communicates with an external service over a computer network to obtain a transcription of an audio, or other form of NUI, file. Alternatively, the transcription module 520 (if included as an element of the exemplary computing device 500) may be configured to carry out the transcription without external assistance.

The intent identification module 522, as the name suggests, is executed to identify the intent of a user's instruction. As discussed above in regard to block 208 of FIG. 2, the intent identification module 522 is that component that identifies and/or determines the user's intent with regard to the instruction (or instructions), as well as any parameters or qualifiers that the user may have supplied. According to various aspects of the disclosed subject matter, the intent identification module 522 utilizes an external service, such as Microsoft's Language Understanding Intelligence Service (LUIS), to determine the user's intent and parameters.

Of course, when determining a specific intent with regard to a user's instruction, there may be times in which the user is not satisfied with the results of the instruction processing agent, where it is because the intent was wrongly identified, there was a loss of fidelity in translating to domain instructions, or that the domain agents failed (or were unable) to completely satisfy a domain instruction. In these circumstances, user feedback regarding the user's satisfaction (or dissatisfaction) are provided to the instruction processing agent 118, possibly via the intent identification module 522, to provide input to a improvement mechanism, such as a machine learning process, that could update the intent identification process and/or update user contextual information.

Based on the user's intent, a domain selector 524 is executed to map the identified user's intent to a particular domain as specified by the catalogue 112 of domains, as shown being stored by the exemplary computing device 500 in a data store 528. Further, based on the identified domain, the domain selector 524 identified a domain agent, such as domain agent 106, that is registered as operating with the identified domain. While the domain selector 524 may typically select only one domain agent to process a user's instruction, the disclosed subject matter is not so limited. Indeed, when circumstances of the user instruction suggest that the selection of multiple domain agents may be useful or advantageous, the domain selector 524 may identify plural domain agents for processing the user instruction.

The instruction generator 526 maps the user instruction into a domain instruction according to a domain ontology 114 corresponding to the identified domain. As indicated above, according to aspects of the disclosed subject matter, the domain ontology 114 may be comprised of nouns and verbs corresponding to the identified domain, where the nouns represent items, or topics, or events or the like, and where the verbs represent actions to be performed in regard to the various nouns. Indeed, according to various embodiments, the user's intent and parameters are mapped as instruction to the domain ontology 114 as REST-styled (Representational State Transfer) objects and/or communications formed or organized according to the identified domain ontology.

Figure 6:
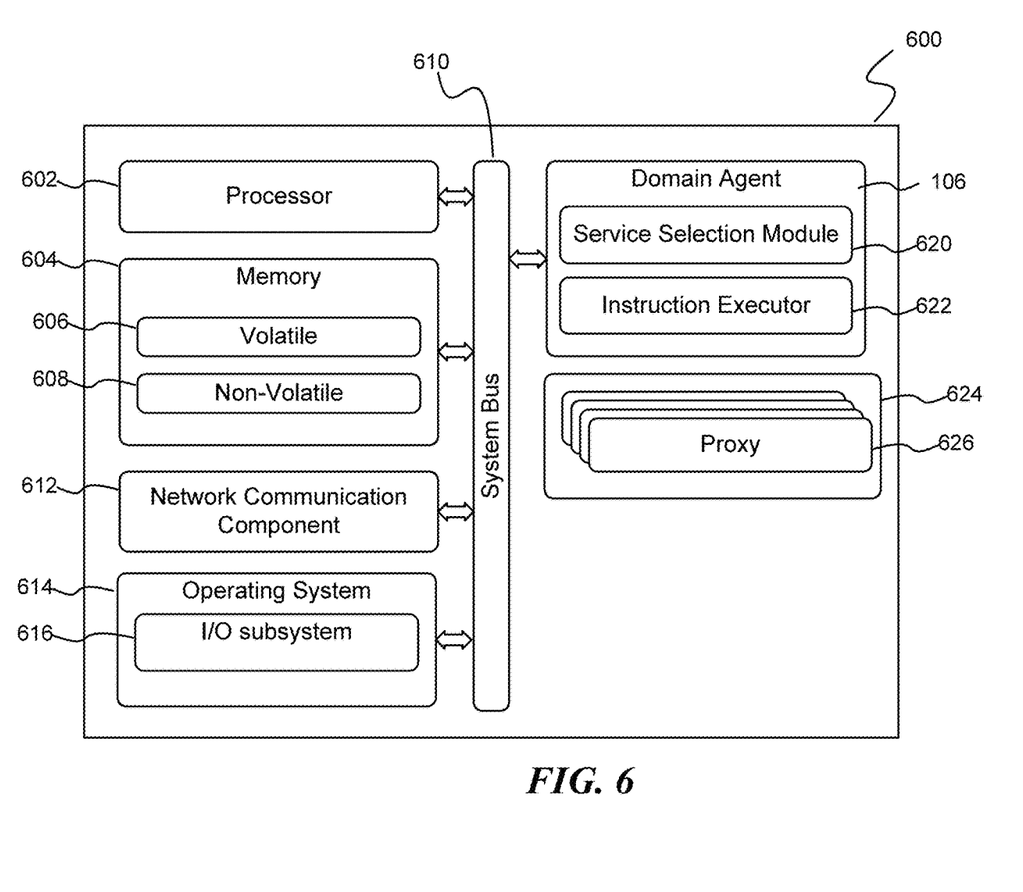
FIG. 6 is a block diagram illustrating an exemplary computing device suitable for implementing one or more aspects of the disclosed subject matter, particularly in regard to a domain agent.

In regard to the domain agents, FIG. 6 is a block diagram illustrating an exemplary computing device 600 suitable for implementing one or more aspects of the disclosed subject matter, particularly in regard to a domain agent such as domain agent 106. As typical with computing devices generally, exemplary computing device 600 includes one or more processors (or processing units), such as processor 602, and one or more memories, such as memory 604. The processor 602 and memory 604, as well as other components, are interconnected by way of a system bus 610. The memory 604 typically (but not always) comprises both volatile memory 606 and non-volatile memory 608. The processor 602 executes instructions retrieved from the memory 604 (and/or from computer-readable media) in carrying out domain instructions via proxies, as discussed above. The processor 602 may be comprised of any of a number of available processors such as single-processor, multi-processor, single-core units, and multi-core units.

The illustrated exemplary computing device 600 also includes a network communication component 612 for interconnecting this computing device with other devices and/or services over a computer network, including the computing device 500 hosting the instruction processing agent 118, as well as other network computing devices and/or systems. As discussed above, the network communication component 612, sometimes referred to as a network interface card or NIC, communicates over a network (such as network 808 of FIG. 8) using one or more communication protocols via a physical/tangible (e.g., wired, optical, etc.) connection, a wireless connection, or both. As will be readily appreciated by those skilled in the art, a network communication component, such as network communication component 612, is typically comprised of hardware and/or firmware components (and may also include or comprise executable software components) that transmit and receive digital and/or analog signals over a transmission medium (i.e., the network.)

The exemplary computing device 600 also includes an operating system 614 to manage the device's hardware and software resources, and that provide common services, sometimes called system services, for computer programs and other executable processes that execute on the computing device including the domain agent 106. An element of the operating system 614 is an I/O (input/output) subsystem 616 by which various executable processes, including the domain agent 106, communicate with other devices and services, both resident on the computing system as well as those external to the computing system.

The exemplary computing device 600 further includes a device-executable domain agent 106. As discussed above and in execution, the domain agent 106 receives one or more domain instructions from the instruction processing agent 118 and carries out the instruction(s) with online services, such as online services 120-124, via one or more proxies 130-134. Included in (or, alternatively, as a cooperative executable components to) the domain agent 106 are various other device-executable components including a service selection module 620, an instruction executor 622, and one or more proxies 624, including proxy 626. In execution, the service selection module selects one or more online services for carrying out a user's instruction (as received from an instruction processing agent 118) and the instruction executor 622 executes the instructions via a proxy, such as proxy 626, corresponding to the selected online service.

Regarding the various components of the exemplary computing devices 400, 500 and 600, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

Moreover, in certain embodiments each of the various components of the various computing devices 400, 500 and 600 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network, such as network 808 of FIG. 8.

Turning to FIG. 7, FIG. 7 is a block diagram illustrating an exemplary computer readable medium encoded with instructions, such as those instructions found in routines 200 and/or 300, formed according to aspects of the disclosed subject matter. More particularly, the implementation 700 comprises a computer-readable medium 708 (e.g., a CD-R, DVD-R or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary methods 200 and 300 above, for example. In another such embodiment, the processor-executable instructions 704 may be configured to implement a system, such as at least some of the exemplary systems 400, 500 or 600, as described above. Many such computer-readable media may be devised, by those of ordinary skill in the art, which are configured to operate in accordance with the techniques presented herein.

Figure 8:
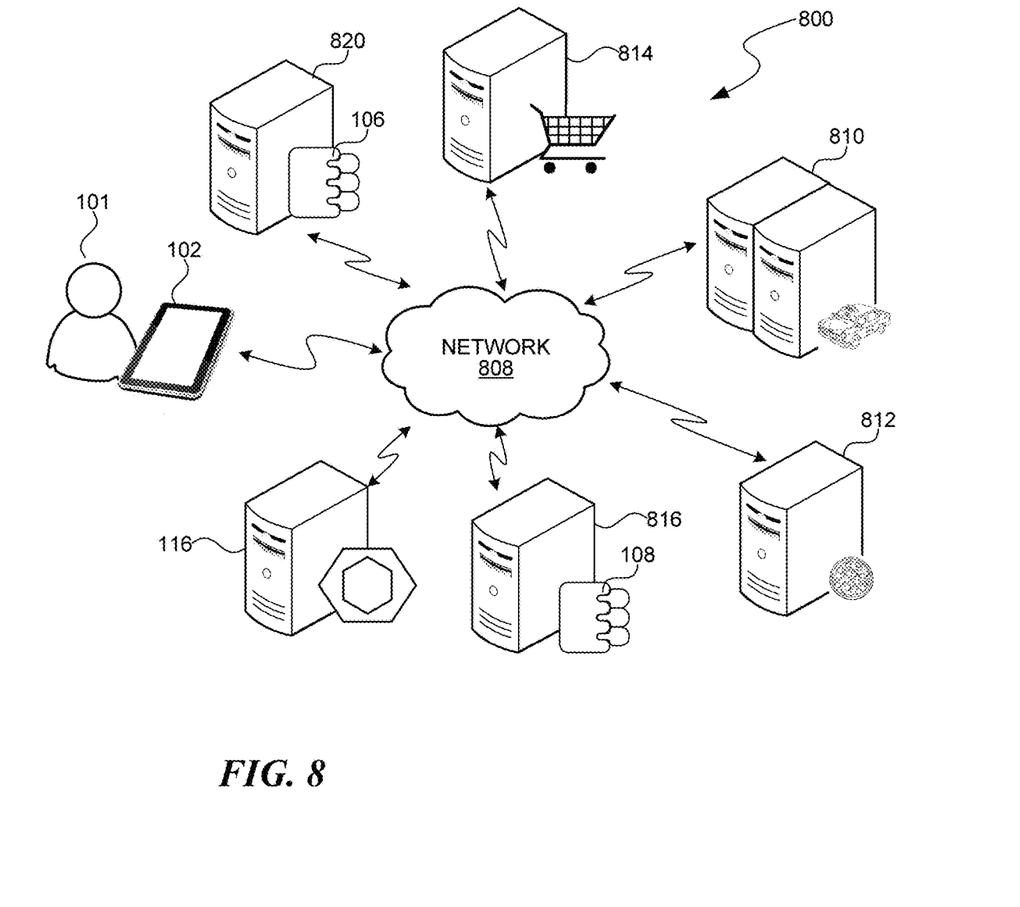
FIG. 8 is a pictorial diagram illustrating an exemplary network environment 800 suitable for implementing aspects of the disclosed subject matter, including the framework for executing user instructions with third-party online services.

FIG. 8 is a pictorial diagram illustrating an exemplary network environment 800 suitable for implementing aspects of the disclosed subject matter, including the framework for executing user instructions with third-party online services. As shown in FIG. 8, the exemplary network environment 800 includes one or more user computing devices (including mobile user computing devices) such as user computing device 102, each associated with a computer user, i.e., user 101. User computing devices, including user computing device 102 and other computing devices such as computing device 810-816 are interconnected by way of a network 808. As those skilled in the art will appreciate, a computer network or data network (referred to as "network" throughout this document by way of shorthand description) is a telecommunications network which allows networked computing devices (computing devices communicatively connected to the network) to exchange data. In computer networks, networked computing devices exchange data with each other along network links (data connections). The connections between nodes are established using either wired and/or wireless connections. While, perhaps, the best-known computer network is the Internet, sometimes also referred to as the "Web," the disclosed subject matter is not limited to operation solely on the Internet.

The exemplary network environment 800 includes a computing device 116 for hosting an instruction processing agent 118 as describe in regard to FIG. 1 above. Also included in the exemplary network environment 800 are computing devices hosting domain agents, such as computing devices 820 and 816, as well as computing devices hosting online services, such as computing devices 810-814.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented framework for processing one or more user instructions on behalf of a computer user, the framework comprising:
   a first computing device comprising a processor and memory, hosting an instruction processing agent, wherein the instruction processing agent, in execution on the first computing device, is configured to receive a user instruction from a user agent executing on a user computing device, and maintain a list of domain agents; and
   one or more domain agent computing devices, the one or more domain agent computing devices hosting a plurality of domain agents wherein each domain agent, in execution on a domain agent computing device of the one or more domain agent computing devices, corresponds to a domain and is configured to receive a domain instruction from the instruction processing agent that can be carried out within the domain, and carry out the domain instruction on behalf of the computer user;
   wherein, in execution, the instruction processing agent:
      receives the user instruction from the user agent;
      identifies a domain suitable for carrying out the user instruction based on an identified intent of the user instruction;
      maps the user instruction into at least one domain instruction according to a domain ontology of the identified domain;
      selects a domain agent of the plurality of domain agents, the selected domain agent corresponding to the identified domain; and
      submits the user instruction to the selected domain agent for execution; and
   wherein, in execution, the selected domain agent:
      maintains a plurality of proxies for interfacing with a plurality of online services, wherein each of the plurality of proxies interfaces with one each of the plurality of online services and maps the domain instruction to a respective one of the one each of the plurality of online services;
receives the domain instruction from the instruction processing agent;
identifies an online service from the plurality of online services for completing the domain instruction; and
executes the domain instruction with the online service via the respective one of the plurality of proxies for the identified online service.

2. The computer implemented framework of claim 1, wherein the instruction processing agent, in identifying a domain and selecting a domain agent:
determines an intent of the computer user with regard to the user instruction; and
selects the domain agent according to a catalogue of domains, the catalogue of domains identifying a plurality of domains with a corresponding one or more corresponding domain agents of a domain.

3. The computer implemented framework of claim 2, wherein determining an intent of the computer user with regard to the user instruction comprises determining the intent according to an external service to the instruction processing agent.

4. The computer implemented framework of claim 2, wherein the instruction processing agent, in execution, further maps the user instruction to domain executable instructions according to a domain ontology of the selected domain.

5. The computer implemented framework of claim 2, wherein the instruction processing agent, in execution, further obtains a user context of the computer user, and submits the user context with the domain instruction to the selected domain agent for execution.

6. The computer implemented framework of claim 5, wherein the selected domain agent:
identifies a second plurality of online services for completing the domain instruction from the plurality of online services; and
executes the domain instruction with the identified second plurality of online services via a corresponding plurality of proxies of the identified second plurality of online services.

7. The computer implemented framework of claim 5, wherein the selected domain agent:
determines an execution context for computer user for executing the domain instruction; and
executes the domain instruction with the online service according to the execution context via a respective one of the plurality of proxies proxy of the identified online service.

8. The computer implemented framework of claim 7, wherein the domain agent further:
receives result information regarding the execution of the domain instruction from the online service via the respective one of the plurality of proxies; and
returns the result information to the instruction processing agent.

9. The computer implemented framework of claim 8, wherein the domain agent further updates the execution context for the computer user according to the received result information regarding the execution of the domain instruction.

10. A computer system providing an instruction processing agent service for processing user instructions on behalf of a computer user, the computing system comprising a processor and a memory, wherein the processor executes computer executable instructions obtained from memory to provide the instruction processing agent service, the computer system further comprising:
an executable instruction processing agent, wherein in execution the instruction processing agent:
maintains a list of domain agents;
receives a user instruction from a user agent on behalf of the computer user;
identifies a domain suitable for carrying out the user instruction based on an identified intent of the user instruction;
maps the user instruction into at least one domain instruction according to a domain ontology of the identified domain;
selects a domain agent of the plurality of domain agents according to a domain selector, the selected domain agent corresponding to the identified domain, wherein the selected domain agent maintains a plurality of proxies for interfacing with a plurality of online services, wherein each of the plurality of proxies interfaces with one each of the plurality of online services and maps the domain instruction to a respective one of the one each of the plurality of online services; and
submits the domain instruction to the selected domain agent for execution.

11. The computing system of claim 10 further comprising:
an executable transcription module that, in execution on the computing system, transcribes an audio user instruction into a common format; and
wherein the instruction processing agent further:
determines that the user instruction comprises an audio user instruction;
transcribes the user instruction to a common format via the transcription module.

12. The computing system of claim 10 further comprising:
an intent identification module that, in execution on the computing system, determines the intent of the user instruction; and
wherein the instruction processing agent selects the domain agent according to a catalogue of domains, the catalogue of domains identifying a plurality of domains with a corresponding one or more corresponding domain agents of a domain.

13. The computing system of claim 12, wherein the intent identification module utilizes an external service for determining the intent of the user instruction.

14. The computer implemented framework of claim 12 further comprising:
an instruction generator that, in execution on the computing system, maps the user instruction to the domain instruction according to a domain ontology of the identified domain; and
wherein submitting the user instruction to the selected domain agent for execution comprises submitting the domain instruction to the domain agent for execution.

15. The computer implemented framework of claim 12, wherein the instruction processing agent further:
determines a user context of the computer user; and
submits the user context with the domain instruction to the selected domain agent for execution.

16. The computer implemented framework of claim 12, wherein the instruction processing agent further:
receives response information from the selected domain agent; and
communicates the response information to the computer user via the user agent.

17. The computer implemented framework of claim 12, wherein the instruction processing agent further maps the user instruction to one or more domain executable instructions according to a domain ontology of the selected domain.

18. The computer implemented framework of claim 12, wherein the instruction processing agent:

selects a second plurality of domain agents from the plurality of domain agents according to a domain selector, the selected second plurality of domain agents corresponding the identified domain; and submits the domain instruction to the selected second plurality of domain agents for execution.

19. A computer system providing a domain agent service for processing user instructions on behalf of a computer user, the computer system comprising a processor and a memory, wherein the processor executes computer executable instructions obtained from memory to provide the domain agent service, the computer system further comprising:

a plurality of online service proxies, each online service proxy configured to interface with a corresponding online service for executing user instructions with the online service on behalf of the domain agent;

wherein, in execution, the domain agent:

receives a user instruction from the instruction processing agent for execution;

identifies an online service from a plurality of online services for completing the user instruction based on an identified intent of the user instruction;

maps the user instruction into at least one domain instruction according to a domain ontology of the identified domain;

executes the domain instruction with the online service via a corresponding online service proxy of the plurality of online service proxies; and returns result information regarding execution of the domain instruction to the instruction processing agent.

20. The computer system of claim 19, wherein the domain agent further:

determines an execution context for computer user for executing the domain instruction; and executes the domain instruction with the online service according to the execution context via the corresponding proxy of the identified online service.

\* \* \* \* \*